United States Patent [19]

Kaeseler

[11] Patent Number: 4,916,931
[45] Date of Patent: Apr. 17, 1990

[54] APPARATUS FOR REPROCESSING SPOT WELDING ELECTRODES

[76] Inventor: Werner Kaeseler, Meisenweg 8, D-3507 Baunatal-Altenritte, Fed. Rep. of Germany

[21] Appl. No.: 167,933

[22] Filed: Mar. 14, 1988

[30] Foreign Application Priority Data

Oct. 20, 1987 [DE] Fed. Rep. of Germany ....... 3735446

[51] Int. Cl.⁴ .................... B21D 3/16; B21D 37/00
[52] U.S. Cl. ........................................ 72/354; 72/359
[58] Field of Search ............... 72/264, 256, 267, 354, 72/356, 358, 359; 29/402.05, 592.1

[56] References Cited

U.S. PATENT DOCUMENTS

| | | | |
|---|---|---|---|
| 3,078,566 | 2/1963 | Egan | 72/267 |
| 3,108,502 | 10/1963 | Chatfield | 72/354 |
| 3,186,209 | 6/1965 | Friedman | 72/356 |
| 3,280,613 | 10/1966 | Schrom | 72/359 |
| 4,249,408 | 10/1981 | Lovell | 72/267 |
| 4,423,617 | 1/1984 | Nippert | 72/354 |
| 4,682,487 | 7/1987 | Kaeseler | 72/354 |

FOREIGN PATENT DOCUMENTS

| | | | |
|---|---|---|---|
| 1427330 | 4/1969 | Fed. Rep. of Germany | 72/359 |
| 854544 | 8/1981 | U.S.S.R. | 72/354 |

*Primary Examiner*—Robert L. Spruill
*Attorney, Agent, or Firm*—William A. Drucker

[57] ABSTRACT

In apparatus according to the present invention, reforming takes place in a single operation. The forming device contains a die extended by a hollow cylindrical die area and includes a punch which is surrounded by an outer punch which is advanced under the tension of a spring and fits into the hollow cylindrical die area. A conical centering area is located upstream of the hollow cylindrical die area. Used spot welding electrodes of different lengths and pronounced deformation can be restored several times with this forming tool.

4 Claims, 1 Drawing Sheet

4,916,931

APPARATUS FOR REPROCESSING SPOT WELDING ELECTRODES

BACKGROUND OF THE INVENTION

The invention relates to apparatus for the processing of used spot welding electrodes. More especially, the invention concerns such apparatus which comprises a press including a forming tool having a punch whose head and shape corresponds to a blind bore in the spot welding electrode, the punch being mounted so as to float laterally about a clearance corresponding to a maximum eccentricity of the blind bore with respect to an external shape of a used spot welding electrode. The press also contains a die having a recess which corresponds to the desired external electrode shape.

DESCRIPTION OF THE PRIOR ART

U.S. Pat. No. 4,682,487 discloses a process and an apparatus for processing used spot welding electrodes for resistance welding, in which the spent electrode is pressed by means of a male die or punch into a recess formed in a female die or die in such a way that its shape coincides with the desired shape of the processed spot welding electrode. The working surface of the electrode assumes the shape fixed by the recess and the diffusion and alloy layers or junctions built up as a result of the preceding use on and/or immediately below the effective working surface of the used electrode are, after processing, also present on and/or immediately below the effective working surface of the processed electrode.

The process described in U.S. Pat. No. 4,682,487 is performed in a single operation, i.e. in a die for spot welding electrodes with limited deformation. For highly deformed electrodes use is made of a two-stage process, the electrode being outwardly upset or gathered in a first die and the final shaping is performed in a second die having the predetermined external contours.

The invention sets out to provide an apparatus and a process by which even highly deformed spot welding electrodes can be reformed in a single operation whilst preserving diffusion and/or alloy layers deposited on to the working surface of the electrodes during previous welding operations.

According to the present invention there is provided apparatus for reforming used spot welding electrodes which apparatus comprises a press including a die formed with a recess which is extended to include a centering area, a punch mounted in a holder of the apparatus with a lateral clearance provided between the opposed surfaces of the punch and the holder, the punch comprising an inner punch movable relative to the die recess between a first position in which the leading end of the inner punch approaches the closed end of the recess to apply pressure to an electrode to be reformed positioned within the die recess and a second position in which the leading end of the inner punch is spaced from said open end of the recess and from the opposed end surface of the second electrode to be reformed, and a hollow outer punch mounted about the periphery of the inner punch and spaced laterally therefrom, the outer punch being movable relative to the die recess between a first position in which the leading edge of the outer punch enters the said centering area of the recess and a second position in which the leading edge of the outer punch is moved away from said centering area of the recess, and spring means operable to apply a force to the outer punch, the arrangement being such that in use of the apparatus with a spot welding electrode to be reformed positioned in the die recess, when the leading edge of the outer punch makes initial contact with the electrode to be reformed, the leading end of the inner punch is spaced a predetermined distance from the internal surface of the end of the electrode, which distance is less than the distance travelled by the inner punch during the reforming operation.

In use of a forming tool according to the invention, in each case in one pressing process the outer punch applies pressure to the edge of the electrode. During the initial pressing operation when the outer punch is applying pressure to the rim of the electrode to be reformed, the tip of the inner punch does not make contact with the internal surface of the end of the blind bore of the electrode. Thus, deformed electrode material passes into the inner electrode area to strengthen the frontal area of the reformed electrode. Subsequent pressure applied to the electrode by the inner punch causes the punch end to make contact with the internal surface of the electrode bore. The outer punch is then caused to move rearwardly against the action of the spring means by reformed electrode material flowing to the sides of the electrode.

The inner and outer punches are together mounted in a laterally floating manner on the press and through its conicity, during its lag the inner punch is laterally displaceable in a narrow range with respect to the outer punch, so that it can adapt to any eccentricity of a used electrode and breaking and high transverse forces are avoided. Due to the adapting or fitting of the outer punch in the cylindrical die area no edge flash is formed. In addition, electrodes of different lengths can be restored in the same die and using the same punch arrangement, i.e. without retooling. There is no need for presorting different electrode types having different lengths. The thickness of the electrode tip, which is in general a prerequisite for aligning the restored electrodes on re-use, is always restored.

In order to facilitate self-centering of the outer punch with respect to the die and the centering of markedly outwardly deformed electrodes, the cylindrical die area is outwardly conically widened in the punch direction. Instead of the punches, the dies could also be mounted in laterally displaceable manner.

The axial force for pressing the outer punch is advantageously produced by a set of compression springs designed for the requisite compressive force whilst taking account of the forward path. However, it is also possible to position hydraulic drive behind the outer punch.

BRIEF DESCRIPTION OF THE DRAWINGS

The invention is described in greater detail hereinafter relative to non-limitative embodiments and the attached drawings, wherein.

DETAILS AND DESCRIPTION OF THE PREFERRED EMBODIMENTS

Figure 1:
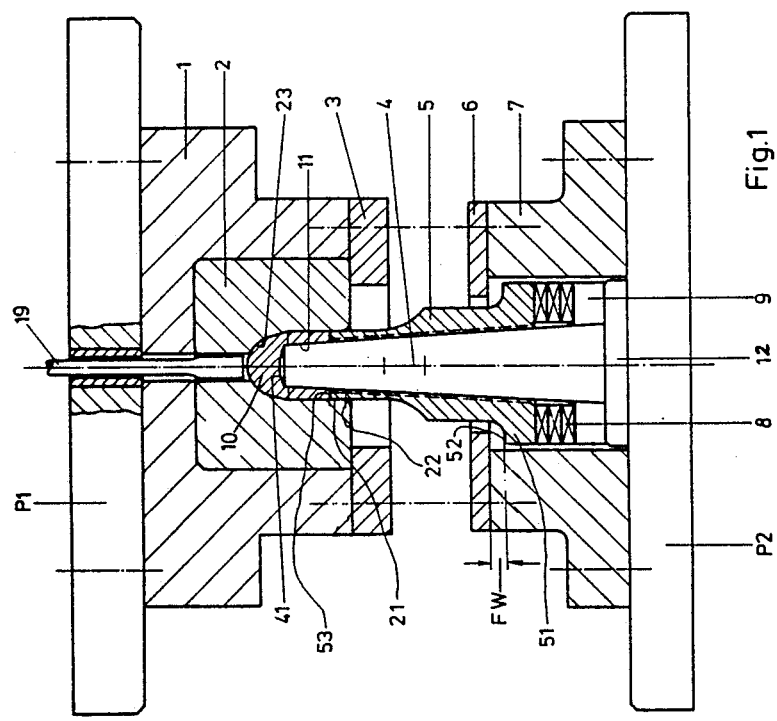
FIG. 1 is a section taken through a forming tool in accordance with the invention.

The forming tool illustrated in FIG. 1 includes two reciprocally displaceable press jaws P1, P2 between which is provided a die 2 formed with a recess 23 corresponding to the desired external shape of a spot welding electrode 10 to be reformed. The die 2 is positioned in a die holder 1 and 3. A conical inner punch 4 and a hollow outer punch 5 are mounted for lateral movement in a punch holder with the longitudinal axis of the inner punch 4 centrally positioned with respect to the die 2. The punch holder comprises a stop ring 6 and a support 7. The lower end of the punch 4 is supported on an abutment plate 12 of the press jaw P2 and is surrounded by a centering plate 9, having an internal taper which complements the external taper of the inner punch to provide a positive connection in the sense that the lower end of the inner punch sits positively within the tapered bore of the centering plate and a non-positive connection in the sense that the force of the springs 8 is applied via the centering plate to the inner punch. A clearance is provided between the radially outer face of the centering plate 9 and the inner face of the support 7. Between the centering plate 9 and a widened shaft shoulder 51 of the outer punch 5 is supported a set of cup springs 8. A stop 52 of the shaft shoulder 51 is biased to bear against the stop ring 6 of the punch holder, by the springs 8 when the press jaws are open.

In the drawings, the apparatus is shown with the press jaws P1, P2 closed and a spot welding electrode 10 to be reformed inserted. Under spring tension, the outer punch 5 is introduced into in the hollow cylindrical die recess 21. The force applied to the electrode by the outer punch 5 during the pressing process is produced by the spring deflection FW between the stop ring 6 and the stop 52 which occurs during each pressing operation. In the direction of punches 4, 5, the cylindrical die area 21 is extended downwardly to include a approximately conical centering area 22 which is used for centering punches 4, 5 and deformed electrodes 10.

Outer punch 5 is tapered internally to correspond to the conicity of punch 4 and externally is progressively thickened on a die-side cylindrical area up to the shaft shoulder 51, so that when centering forces occur, no bending moment peaks occur which could lead to fracture. The conicity of the centering area 22 is designed in accordance with the expected maximum external eccentricity of the electrodes 10, so that the latter fit into the die 2 during the first travel of the outer punch 5. The lateral clearance of the outer punch 5 in the mounting support 7 is designed in accordance with the widening of the centering area 22 of the die 2. The lateral clearance of the inner punch 4 is in accordance with the maximum internal eccentricity of the blind bore 11 of the spot welding electrodes 10 to be restored.

The restoration of highly deformed electrodes by forming and without material loss makes it possible to re-form electrodes several times, e.g. ten times. The alloy and diffusion layer built up during use of electrodes and in particular when welding protectioncoated metal sheets, is retained during reforming and is strengthened, so that very long electrode life periods are obtained and there is no need to change the operating parameters of the welding apparatus when putting the restored electrodes into operation again. In addition, through the retention of the diffusion layer, there is no depletion with respect to the protective coating material, e.g. zinc at the spot welding points, as occurs with new electrodes formed from copper alloys. In known manner, an ejector pin 19 is centrally positioned in the die 2.

The slight conicity of the inner punch 4 and the convexity of its upper end 41 enables electrode material which has been forced inwardly during the initial pressing operation by the outer punch 5 to be distributed outwardly during the subsequent pressing operation by the inner punch 4 to restore the predetermined internal configuration of the reformed electrode. Lateral forces which may be produced due to any eccentricities of the inwardly displaced material will be absorbed with the assistance of the outer punch 5, which has a much higher moment of resistance, so alleviating the possibility of fracturing of the inner punch.

Figure 2:
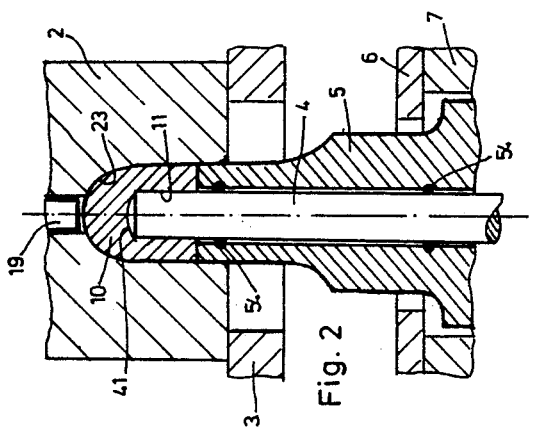
FIG. 2 is a section taken through a detail of the inner and outer punch areas of a modified construction of forming tool in accordance with the invention.

In the case of the modified construction illustrated in FIG. 2 of the drawings, the basic principle of which corresponds to that of the construction illustrated in FIG. 1, the inner punch 4 is of cylindrical construction and the outer punch 5 is also internally of cylindrical construction. Outer punch 5 surrounds the inner punch in a floating manner and with a limited clearance provided between the inner and outer punches. For this floating, interengaging guidance, outer punch 5 is internally provided with sealing or O-rings 54, which are spaced from one another in the longitudinal direction of the punch and are held in circular groves thereof towards the upper and lower end of outer punch 5. The floating bearing play of the interengaging punches 4, 5, is ensured by the O-rings 54.

I claim:
1. Apparatus for reforming used spot welding electrodes, which apparatus comprises:
   (a) a press including a die formed with a closed end recess which is extended to include a conical centering area at an open end of the recess,
   (b) a punch mounted in a holder of the apparatus with a lateral clearance provided between the opposed surfaces of the punch and the holder to allow said punch to self-align, the punch comprising:
   (c) an inner punch movable relative to the die recess between a first position in which the leading end of the inner punch is within the die recess and spaced a predetermined distance from the closed end of the recess to apply pressure to an electrode to be reformed positioned within the die recess and a second position in which the leading end of the inner punch is spaced from said open end of the recess and from the opposed end surface of the said electrode to be reformed, and
   (d) a hollow outer punch mounted about the periphery of the inner punch and spaced laterally therefrom to define a clearance for allowing relative lateral alignment therebetween, the outer punch being movable relative to the die recess between a first position in which the leading edge of the outer punch enters the said centering area of the recess and a second position in which the leading edge of the outer punch is spaced away from said centering area of the recess, and spring means positioned about an end of the second punch remote from the leading edge and operable to apply a force to the outer punch, the arrangement being such that in use of the apparatus with a spot welding electrode to be reformed positioned in the die recess, when the leading edge of the outer punch makes initial contact with the electrode to be reformed, the leading end of the inner punch is spaced a predetermined distance from the internal surface of the end of the electrode, which distance is less than the distance travelled by the inner punch during the reforming operation, means to force at least one of said die and punches toward the other for reforming said spot welding electrodes.

2. Apparatus as claimed in claim 1 wherein the outer surface of the leading end of the inner punch is convex in shape and the outer surface of the inner punch is frusto-conical in shape with the internal surface of the outer punch tapered to complement the conicity of the inner punch.

3. Apparatus as claimed in claim 1 wherein the inner and outer punches are cylindrical in cross-section and wherein elastic "O" rings are positioned within the clearance defined between the opposed surfaces of the inner and outer punches.

4. Apparatus as claimed in claim 1 further comprising a centering ring which defines a close fit about the end of the inner punch remote from the die recess, the spring means being positioned between a surface of the centering ring and surface of the said remote end of the outer punch.

* * * * *